US005128918A

United States Patent [19]

Suzuki et al.

[11] Patent Number: 5,128,918

[45] Date of Patent: Jul. 7, 1992

[54] DISK LOADING DEVICE FOR DISK PLAYER

[75] Inventors: Shoji Suzuki; Kenji Yatsu, both of Iwaki, Japan

[73] Assignee: Alpine Electronics, Inc., Tokyo, Japan

[21] Appl. No.: 568,443

[22] Filed: Aug. 15, 1990

[30] Foreign Application Priority Data

Sep. 29, 1989 [JP] Japan ................................ 1-256052

[51] Int. Cl.$^{5}$ ........................ G11B 17/04; G11B 1/00

[52] U.S. Cl. ................................ 369/77.1; 369/77.2; 369/75.1; 369/75.2

[58] Field of Search .................... 369/77.1, 77.2, 75.2, 369/191, 194, 36, 37, 38, 39, 187, 188

[56] References Cited

U.S. PATENT DOCUMENTS

| | | | |
|---|---|---|---|
| 4,592,039 | 5/1986 | Toyoguchi et al. | 369/77.2 X |
| 4,691,309 | 9/1987 | Suzuki | 369/38 |
| 4,701,900 | 10/1987 | Hasegawa et al. | 369/36 |
| 4,707,819 | 11/1987 | Ehara | 369/77.2 |
| 4,722,078 | 1/1988 | Nakanishi et al. | 369/39 |
| 4,737,945 | 4/1988 | Yamazaki et al. | 369/36 |
| 4,786,998 | 11/1988 | Sugawara et al. | 360/97 |
| 4,797,865 | 1/1989 | Imai et al. | 369/36 X |

FOREIGN PATENT DOCUMENTS

| | | | |
|---|---|---|---|
| 1-08918 | 9/1989 | Japan | 369/191 |

*Primary Examiner*—Stuart S. Levy
*Assistant Examiner*—Tan Nguyen
*Attorney, Agent, or Firm*—Guy W. Shoup; Norman R. Klivans; B. Noël Kivlin

[57] ABSTRACT

A cartridge loading device for a disk player wherein a disk fed to a regular loading position can be detected with a simple mechanism and also a disk clamping operation can be started only after a disk is moved with certainty to the regular loading position. The device includes a detecting element disposed for engagement by a leading end portion of a disk being fed by a disk feeding mechanism to move in the same direction as the direction of movement of the disk, a motor-driven driving rotary member, a changeover rotary member normally disconnected from the driving member but rotatable to an operative position at which the changeover rotary member is connected to the driving rotary member so that the changeover rotary member is driven to rotate by the driving rotary member, a trigger member disposed for integral movement with the detecting element to rotate the changeover rotary member to the operative position, and a power transmitting mechanism for transmitting the power of rotation of the changeover rotary member by the driving rotary member to operate a clamping mechanism.

6 Claims, 8 Drawing Sheets

DISK LOADING DEVICE FOR DISK PLAYER

BACKGROUND OF THE INVENTION

1. Field of the Invention

This relates to a disk loading device for placing a disk in position onto a turntable of a disk driving section of an optical disk player or the like.

2. Description of the Prior Art

Disk players into which a disk such as a compact disk is to be loaded normally include a feeding mechanism for feeding a disk to a disk driving section, and a clamp mechanism for placing a disk fed into the disk driving section in position onto a turntable and clamping the disk on the turntable. Accordingly, an optical detector is conventionally provided in a feeding route of a disk, and when the optical detector detects that a disk has been moved to a regular loading position, a solenoid or some other actuator is energized. Then, the clamp mechanism is rendered operative using the operation of the solenoid or the like as a trigger signal to clamp the disk on the turntable.

However, in such a construction wherein a disk fed to a loading position is detected by means of an optical detector, accurate detection of a position of a disk may not be achieved because the disk sometimes has a portion through which light can pass depending upon the type of the disk. Further, since the solenoid is rendered operative to start operation of the clamp mechanism after detection by the optical detector, the timing of operations of those elements may be put out of order. Besides, an adjusting operation to establish regular timing is required, which complicates the adjusting procedure after assembly of the components. In addition, the construction is disadvantageous in that it requires expensive parts such as an optical detector and a solenoid and is high in production cost.

SUMMARY OF THE INVENTION

It is an object of the present invention to provide a cartridge loading device for a disk player wherein a disk fed to a regular loading position can be detected with a simple mechanism and besides a disk clamping operation can be started only after a disk is moved with certainty to the regular loading position.

In order to attain the object, according to the present invention, there is provided a disk loading device for a disk player which includes a disk driving section including a turntable for driving a disk to rotate and a pickup for reading information on a disk being driven by the turntable, a disk feeding mechanism for feeding a disk into the disk driving section, and a clamping mechanism for fixing a central portion of a disk fed into the disk driving section to the turntable, the disk loading device comprising a detecting element disposed for engagement by a leading end portion of a disk being fed by the disk feeding mechanism to move in the same direction as the direction of movement of the disk, a motor-driven driving rotary member, a changeover rotary member normally disconnected from the driving member but rotatable to an operative position at which the changeover rotary member is connected to the driving rotary member so that the changeover rotary member is driven to rotate by the driving rotary member, a trigger member disposed for integral movement with the detecting element to rotate the changeover rotary member to the operative position, and a power transmitting mechanism for transmitting the power of rotation of the changeover rotary member by the driving rotary member to operate the clamping mechanism.

With the disk loading device, when a disk is fed toward the disk driving section by the feeding mechanism, or more particularly when, for example, a disk is moved to a position a little forwardly of a regular loading position in the disk driving section, a leading end portion of the disk is engaged with the detecting element and then moves the detecting element in the direction of movement of the disk. Upon such movement of the detecting element, the trigger member is moved in an integral relationship with the detecting element and rotates the changeover rotary member by a predetermined angle to the operative position. Consequently, the changeover rotary member is connected to the driving rotary member so that it is thereafter rotated by the latter. Rotation of the changeover rotary member is transmitted to the clamping mechanism to clamp the disk in a centered condition by the turntable. Since movement of a disk is detected directly by the detecting element and the changeover rotary member is rotated to the operative position by the trigger member which is moved in an integral relationship with the detecting element in this manner, operating timing of the various components can be set with certainty. Further, since a disk is not clamped until after it is detected that the disk has arrived at a predetermined position, an error in clamping operation of a disk is eliminated. Besides, since expensive parts such as an optical detector or a solenoid are not employed as in a conventional device, the device can be produced at a reduced cost.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
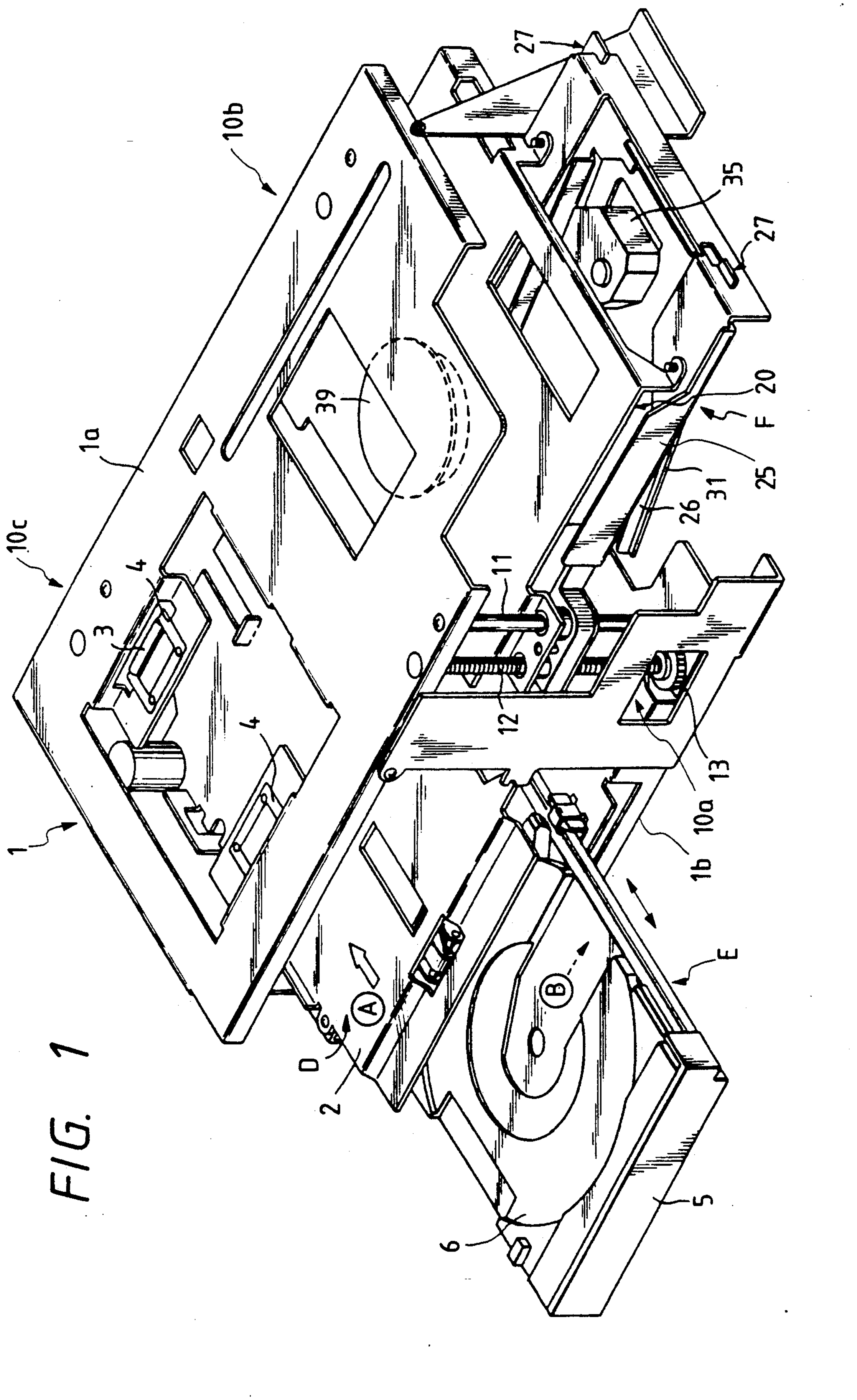
FIG. 1 is a perspective view showing an appearance of a disk player with a disk changer in which a disk loading device to which the present invention is applied is incorporated.
Figure 2:
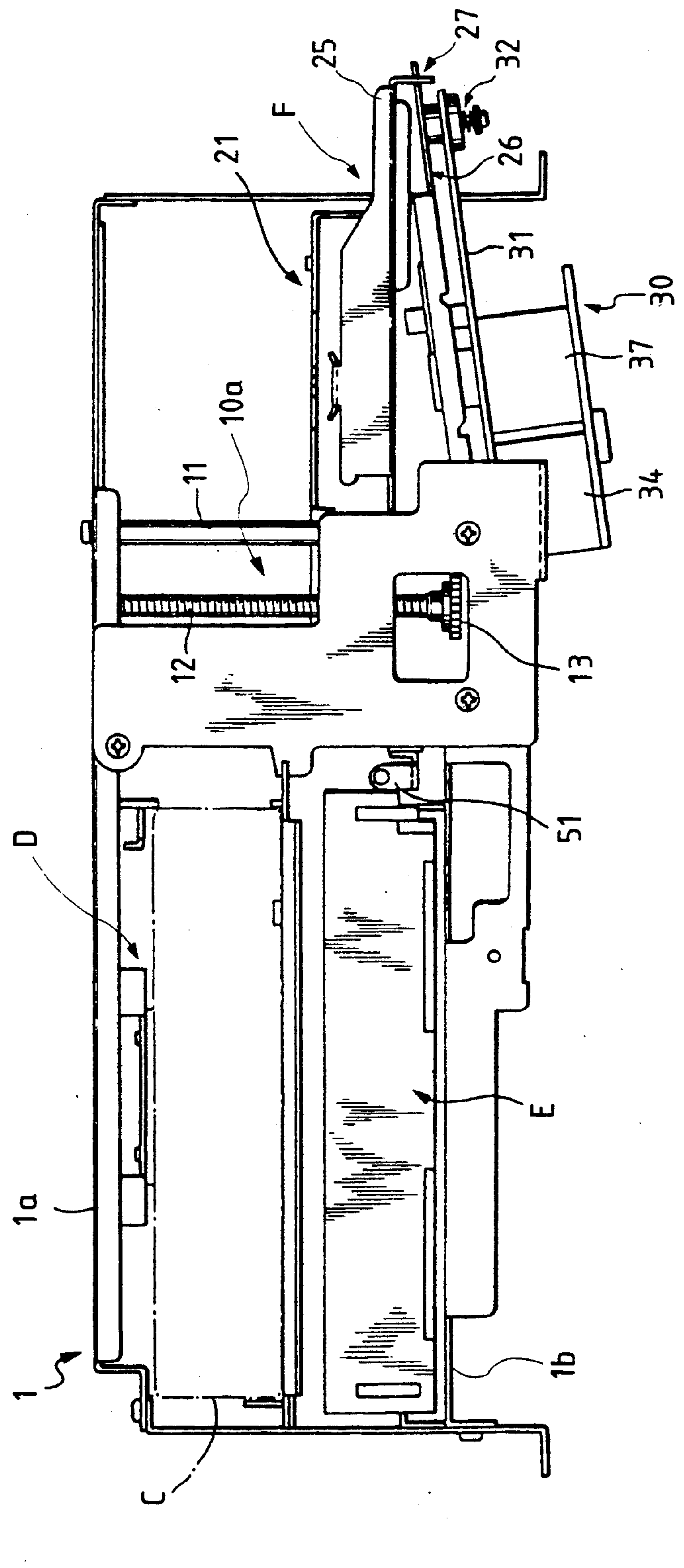
FIG. 2 is a front elevational view of the disk player of FIG. 1.
Figure 9:
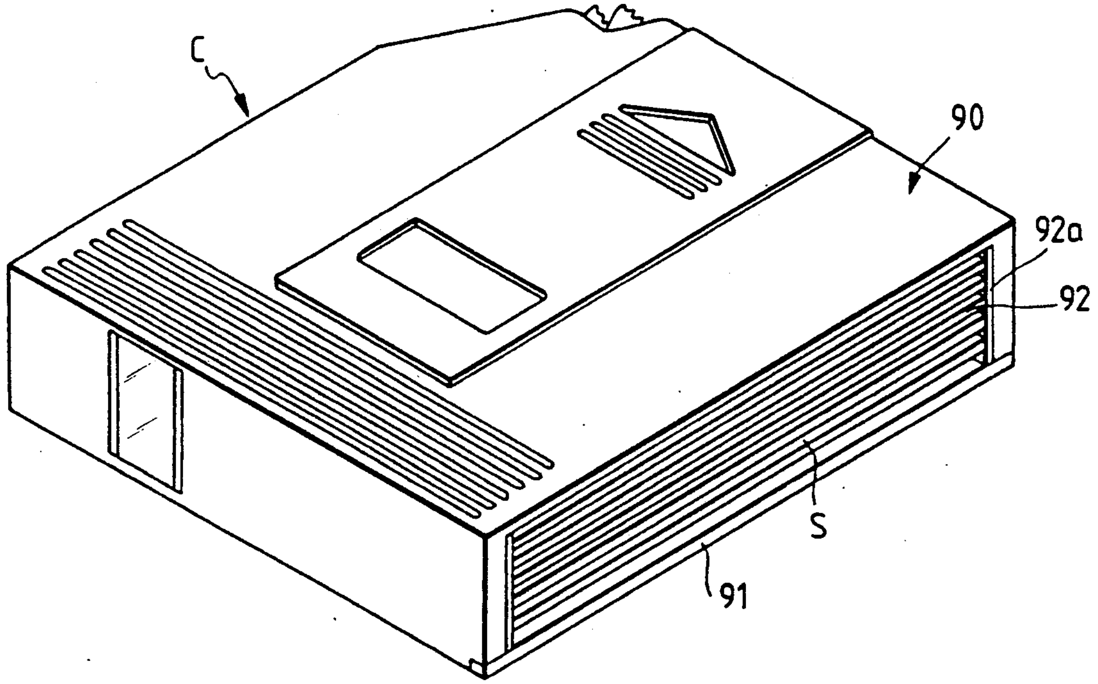
FIG. 9 is a perspective view of a disk cartridge for use with the disk player of FIG. 1.

Referring first to FIGS. 1 and 2, there is shown an entire mechanism of a compact disk player with a disk changer for domestic use. The disk player shown includes a body chassis 1 in which a cartridge mounting section D, a single disk supplying section E and a disk driving section F are arranged. Such a disk cartridge C as shown in FIG. 9 in which a plurality of, 6 in the arrangement shown, compact disks are accommodated is inserted in the direction indicated by an arrow mark Â from forward into the cartridge mounting section D. A cartridge table 2 is disposed at a lower portion of the cartridge mounting section D such that a disk cartridge C is mounted in position into the cartridge mounting section D under the guidance of the cartridge table 2. A pair of pressing rollers 3 (only one is shown in FIG. 1) are mounted on a ceiling plate 1*a* of the body chassis 1. Each of the pressing rollers 3 is normally urged by a leaf spring 4 so that the disk cartridge C mounted in position on the mounting section D is pressed against the cartridge table 2 by the urging forces of the leaf springs 4.

The single disk supplying section E is disposed below the cartridge mounting section D. At the single disk supplying section E, a slide table 5 is advanced from and retracted into the body chassis 1. A disk tray 6 is located on the slide table 5. The disk tray 6 is constructed such that disks having different diameters such as a compact disk and a single compact disk can be selectively received thereon. After the slide table 5 is accommodated into the body chassis 1, the disk tray 6 is permitted to move in the direction indicated by an arrow mark Ⓑ in FIG. 1, and upon such movement of the disk tray 6, a disk is supplied into the disk driving section F together with the disk tray 6.

Figure 3:
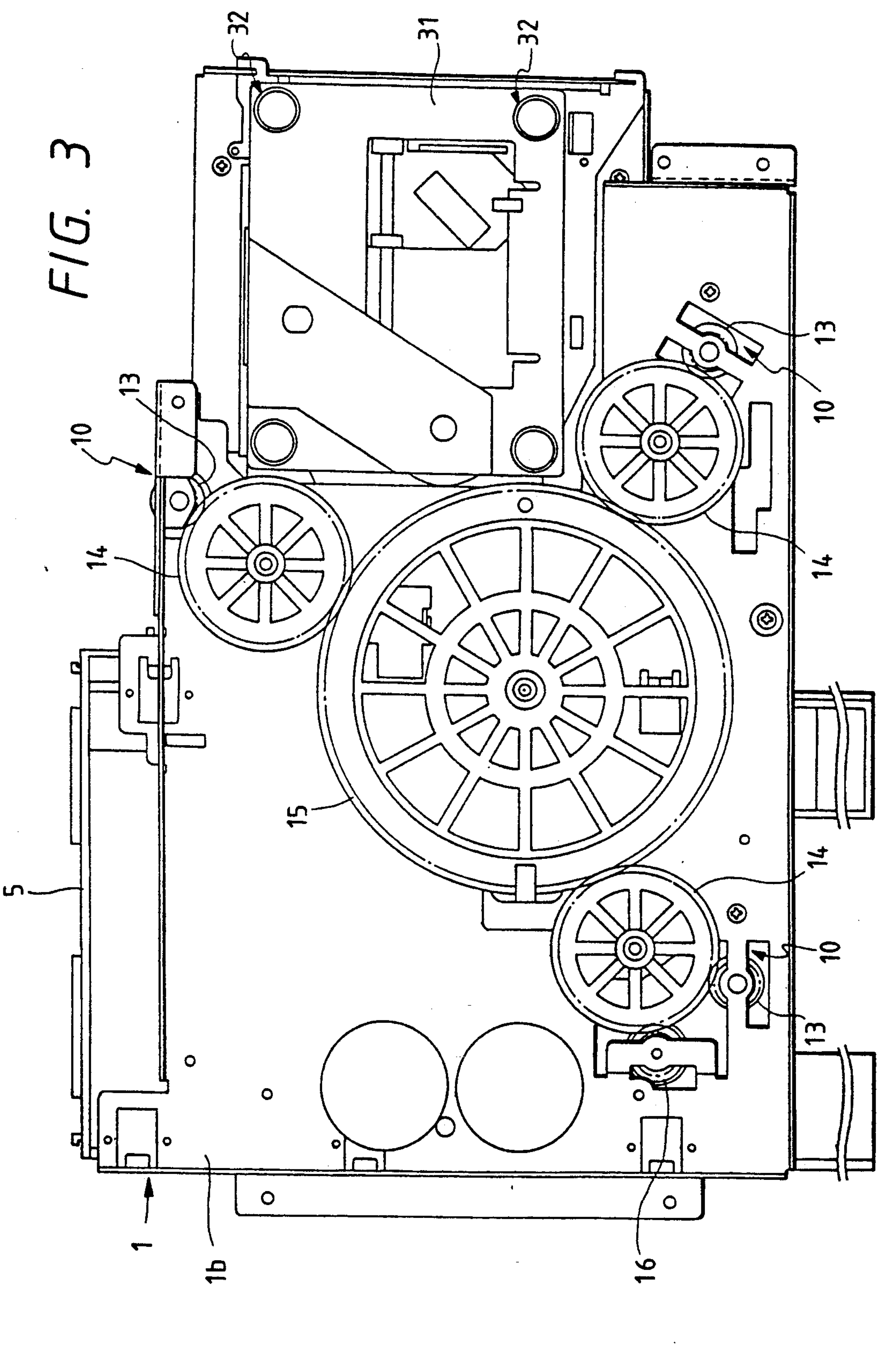
FIG. 3 is a bottom plan view of the disk player of FIG. 1.

Meanwhile, three lifting mechanisms 10*a*, 10*b* and 10*c* are located in the body chassis 1 as shown in FIGS. 1 and 2. Each of the lifting mechanisms 10*a*, 10*b* and 10*c* is composed of a guide shaft 11, a lifting screw 12 and a gear 13 secured to a lower end of the lifting screw 12. The gears 13 of the lifting mechanisms 10*a* to 10*c* are driven to rotate in a synchronized relationship by a driving mechanism provided on a lower face of a bottom plate 1*b* of the body chassis 1. In particular, referring to FIG. 3, three intermediate gears 14 are disposed on the lower face of the bottom plate 1*b* of the body chassis 1 and normally held in meshing engagement with the gears 13 of the lifting mechanisms 10*a* to 10*c*. The intermediate gears 14 are further held in meshing engagement with a large gear 15 which is also disposed on the lower face of the bottom plate 1*b* of the body chassis 1. A drive gear 16 is held in meshing engagement with one of the intermediate gears 14 which is disposed at a lower left-hand side location in FIG. 3 of the body chassis 1. The drive gear 16 is connected to be driven by a motor not shown. Power of the motor is transmitted from the drive gear 16 to the large gear 15 by way of the intermediate gear 14. Then, upon rotation of the large gear 15, the three gears 13 are rotated in a synchronized relationship with each other by way of the intermediate gears 14 to thus rotate the lifting screws 12 of the lifting mechanisms 10*a* to 10*c* in a synchronized relationship with each other.

The disk driving section F is driven to move upwardly or downwardly in the body chassis 1 by the lifting mechanisms 10*a* to 10*c*.

Figure 4:
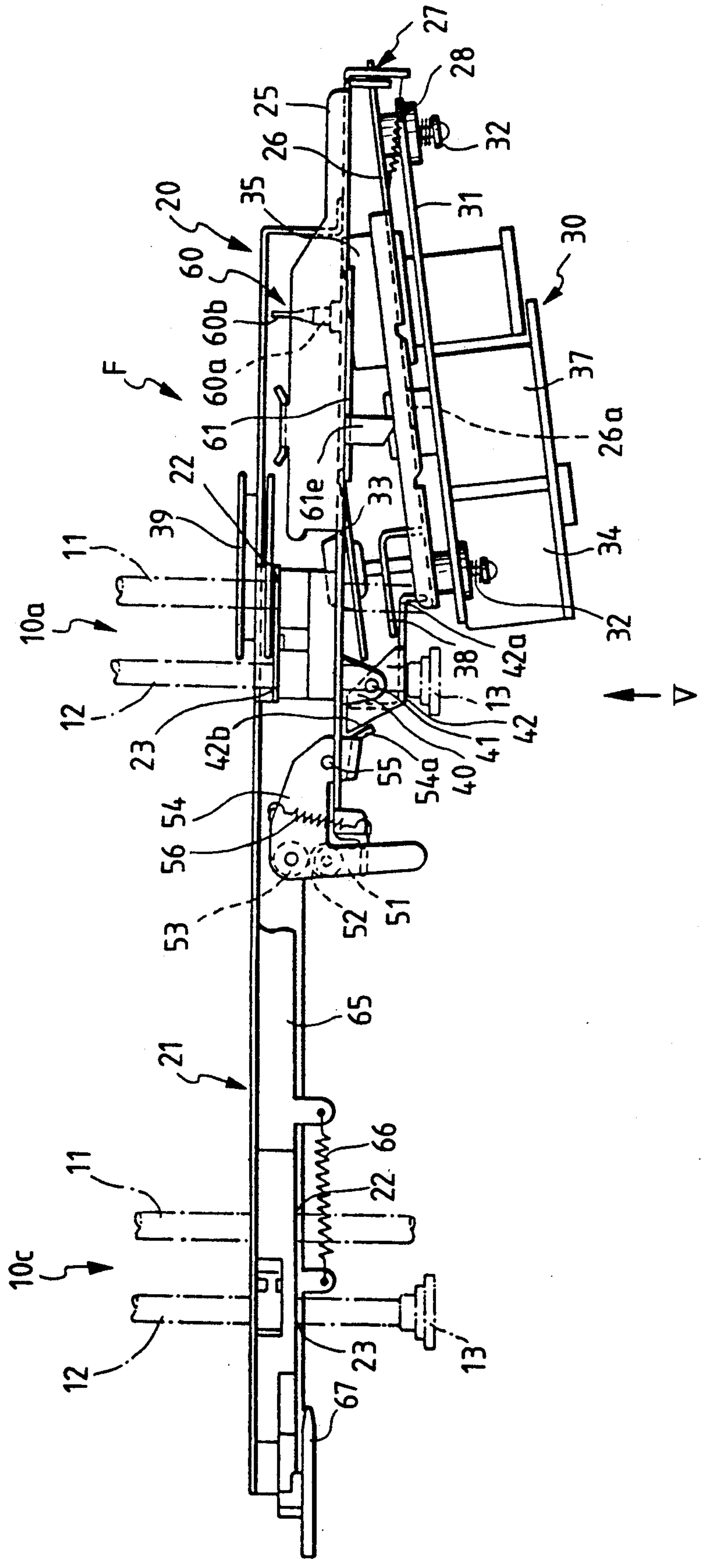
FIG. 4 is a front elevational view showing a disk driving section of the disk player of FIG. 1.
Figure 5:
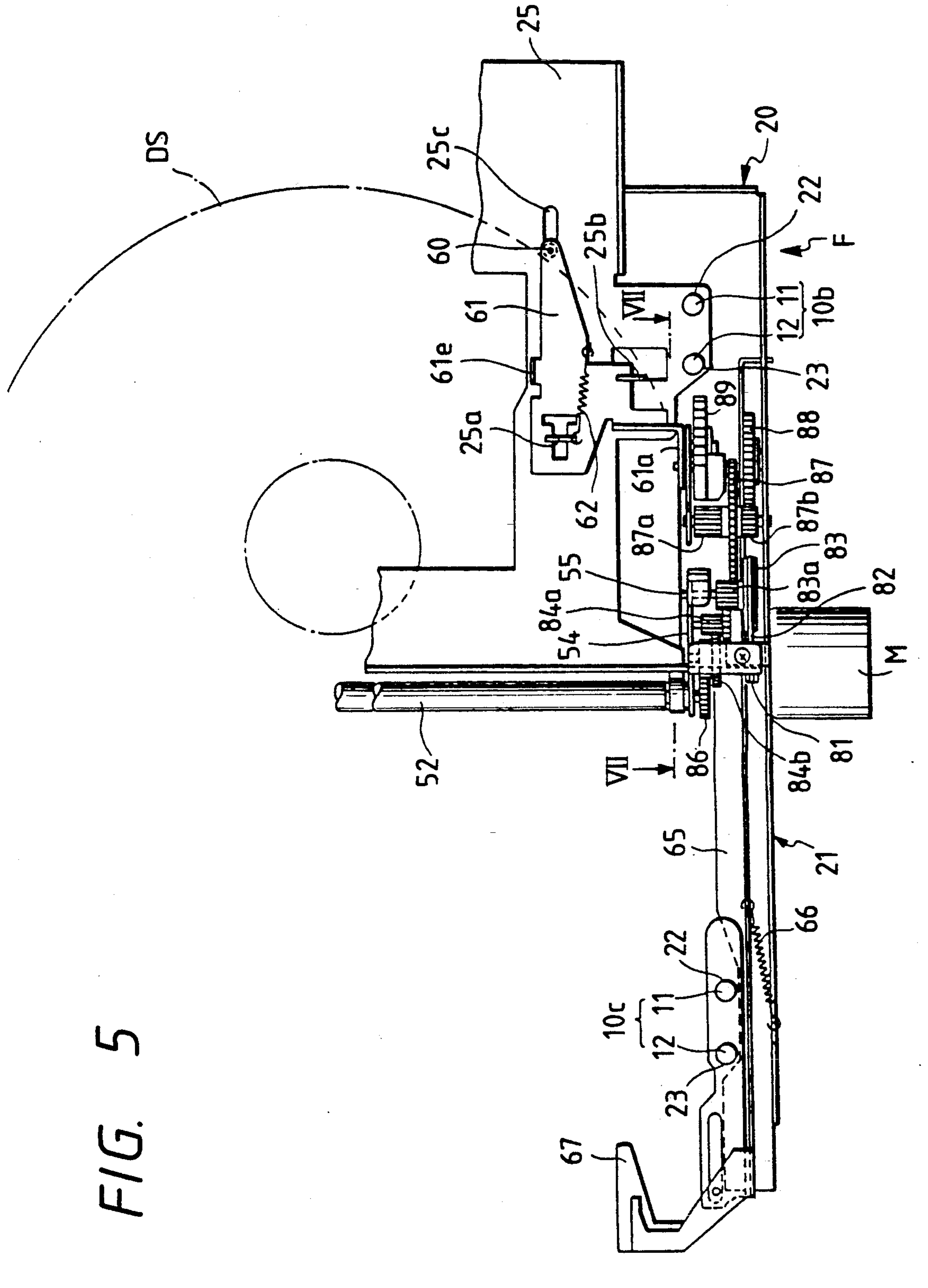
FIG. 5 is a bottom plan view of the disk driving section as viewed in the direction indicated by an arrow mark V in FIG. 4.

Referring to FIGS. 1, 4 and 5, a lift table 20 is located in the disk driving section F. A disk drawing out portion 21 extends linearly leftwardly on the rear side (lower side in FIG. 5) of the lift table 20. The lift table 20 has a guide hole 22 and an adjacent female threaded hole 23 formed at each of portions thereof corresponding to the lifting mechanisms 10*a* to 10*c*. The guide shafts 11 of the lifting mechanisms 10*a* to 10*c* are fitted in the guide holes 22 of the lift table 20 while the lifting screws 12 are screwed in the female threaded holes 23. When the three gears 13 are driven in a synchronized relationship by the large gear 15 and intermediate gears 14 provided on the lower face of the bottom plate 1*b* of the body chassis 1 to rotate the lifting screws 12 of the three lifting mechanisms 10*a* to 10*c* in a synchronized relationship, the lift table 20 shown in FIG. 4 is driven to move upwardly or downwardly in the body chassis 1. By such upward or downward movement of the lift table 20, it can be positioned to a position corresponding to one of disks accommodated in the disk cartridge C described hereinabove or to another position at which a disk placed on the disk tray 6 can be taken out from the disk tray 6.

Referring now to FIGS. 2 and 4, an intermediate table 25 is located in a predetermined spaced relationship below the lift table 20 in the disk driving section F. A clamp chassis 26 is disposed below the intermediate table 25. The clamp chassis 26 is held in engagement with the intermediate table 25 such that a right-hand end in FIGS. 2 and 4 thereof acts as a fulcrum 27 of pivotal motion of the clamp chassis 26. Thus, the clamp chassis 26 is rocked upwardly or downwardly around the fulcrum 27 with respect to the intermediate table 25. A spring 28 extends between the intermediate table 25 and the clamp chassis 26 to urge the clamp chassis 26 downwardly in FIG. 4. A disk reproducing unit 30 is mounted at a lower portion of the clamp chassis 26. A pickup chassis 31 of the disk reproducing unit 30 is mounted on the clamp chassis 26 by way of a damper supporting mechanism 32. A turntable 33 and a spindle motor 34 for rotating the turntable 33, an optical pickup 35 having an objective lens (not shown) and a holder 36 formed contiguously to a lower portion of the optical pickup 35 for holding optical parts thereon, a scanning motor 37 for moving the optical pickup 35 along a record surface of a disk and so forth are carried on the pickup chassis 31.

Referring to FIG. 4, a bracket 40 is formed at a left-hand end portion in FIG. 4 of the intermediate table 25 of the disk driving section F by laterally bending a tab of the intermediate table 25 downwardly, and a lifting actuating lever 42 is supported for pivotal motion on the bracket 40 by means of a shaft 41. The lifting actuating lever 42 has a substantially L-shape in front elevation as seen in FIG. 4 and thus has a pushing up arm 42*a* extending rightwardly therefrom. Meanwhile, an inverted L-shaped engaging piece 38 is provided on an upper face of the pickup chassis 31 and located in an opposing relationship above the pushing up arm 42*a* of the lifting actuating lever 42. In the condition shown in FIG. 4, the clamp chassis 26 is at its downwardly pivoted position around the fulcrum 27 by the urging force of the spring 28 while the disk reproducing unit 30 is also at its downwardly moved position together with the clamp chassis 26. If the lifting actuating lever 42 is pivoted in the counterclockwise direction from the position shown in FIG. 4, the pushing up arm 42*a* thereof is engaged with and pushes up the engaging piece 38 to pivot the the clamp chassis 26 and the disk reproducing unit 30 upwardly around the fulcrum 27. A clamper 39 is mounted on the lift table 20. Though not shown, the clamper 39 has a magnet built therein. Then, when the disk reproducing unit 30 is lifted, the clamper 39 is attracted to the turntable 33 which is made of a magnetic material, and consequently, a disk is clamped between the turntable 33 and the clamper 39.

A bracket 51 is formed at a left-hand side end of the intermediate table 25 of the disk driving section F by bending a table of the intermediate table 25 upwardly. A lower roller 52 which serves as a component of a disk feeding element is supported on the bracket 51. A pivotal bracket 54 is supported on the intermediate table 25 by means of a shaft 55, and an upper roller 53 is supported on the pivotal bracket 54. The pivotal bracket 54 is normally urged in the counterclockwise direction in FIG. 4 by a spring 56 so that the upper roller 53 may be resiliently pressed against the lower roller 52. The upper roller 53 is connected to be rotated in the counterclockwise or clockwise direction by a motor driving mechanism which will be hereinafter described. When the upper roller 53 is rotated in the counterclockwise direction in FIG. 4 by the motor driving mechanism, a disk is held between the upper and lower rollers 52 and 53 and is fed in toward the turntable 33. On the contrary when the upper roller 53 is rotated in the clockwise direction, a disk is fed out from the turntable 33 by the roller 53. The pivotal bracket 54 on which the upper roller 53 is supported has an engaging tab 54*a* formed thereon and extending in the rightward direction in FIG. 4. The engaging tab 54*a* of the pivotal bracket 54 is opposed to a pressing finger 42*b* of the lifting actuating lever 42. When the lifting actuating lever 42 is pivoted in the counterclockwise direction in FIG. 4 as described hereinabove, the disk reproducing unit 30 is pushed up by the pushing up arm 42*a* of the lifting actuating lever 42 while at the same time the pivotal bracket 54 is pivoted in the clockwise direction in FIG. 4 by the pressing finger 42*b* of the lifting actuating lever 42 to move the upper roller 53 upwardly away from the lower roller 52 thereby to render the feeding force of the upper roller 53 upon a disk ineffective.

Figure 6:
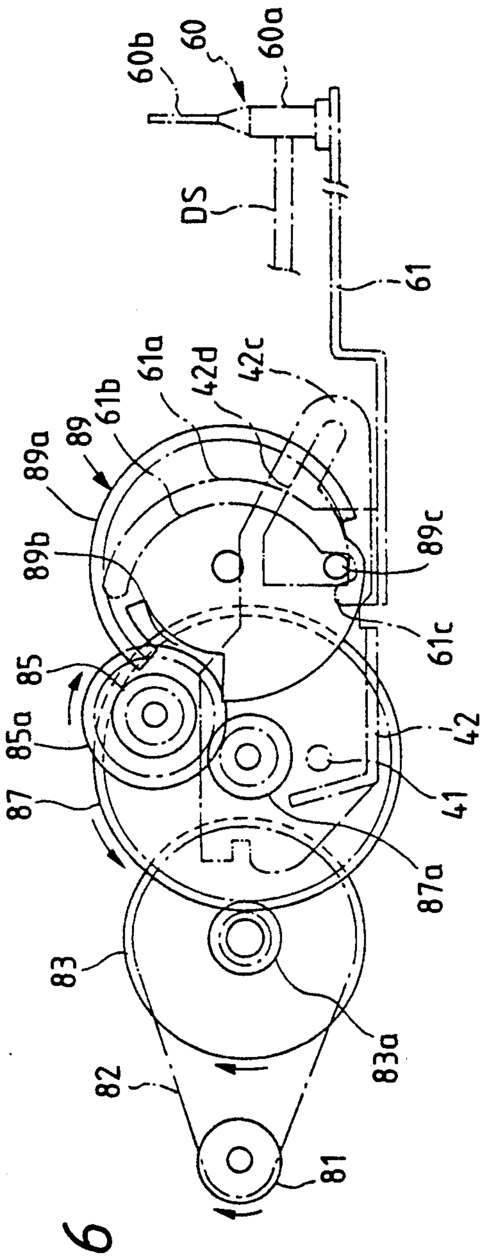
FIGS. 6 and 7 are sectional views taken along line VII—VII of FIG. 5 showing the disk driving section in different positions.
Figure 7:
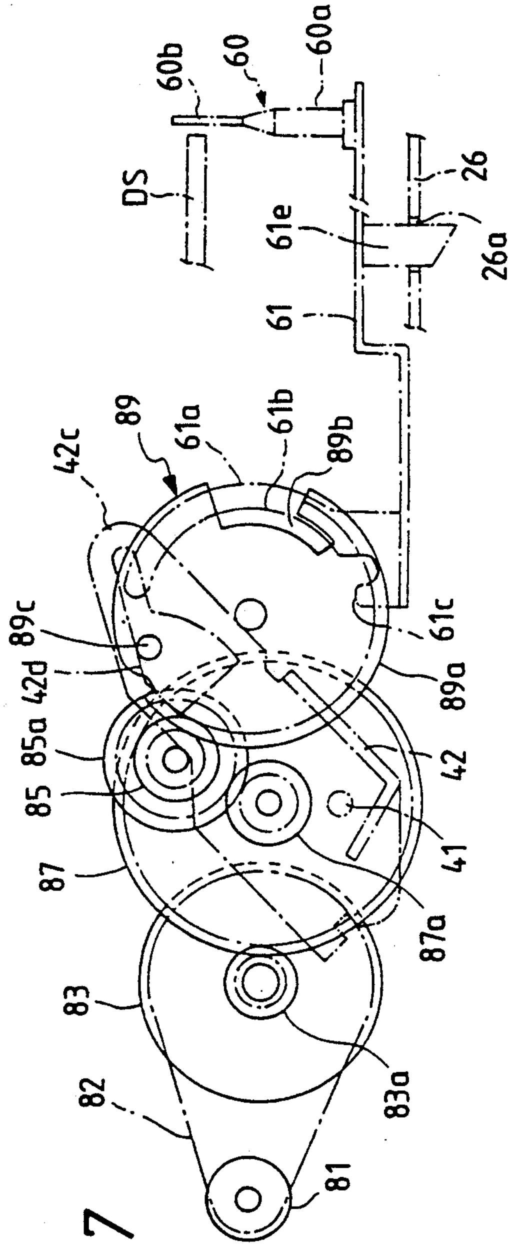

Referring to FIG. 4. a detecting element or projection 60 is located at an intermediate portion of the intermediate table 25 in the disk driving section F. The detecting element 60 is disposed for engagement with a leading end of a disk which is fed into the disk driving section F by the upper and lower rollers 53 and 52 of the disk feeding mechanism. The detecting element 60 is in the form of a metal pin having a larger diameter base portion 60*a* and a smaller diameter end portion 60*b* which are interconnected by a tapered face as seen in FIG. 4. The detecting element 60 is secured to a trigger lever 61. Referring to FIG. 5, the trigger lever 61 is mounted on a lower face of the intermediate table 25. The trigger lever 61 is guided for sliding movement in the leftward and rightward directions in FIG. 5 by a pair of guide pieces 25*a* and 25*b* in the form of downwardly bent lugs of the intermediate table 25. The trigger lever 61 is normally biased in the leftward direction in FIG. 5 by a spring 62. The detecting element 60 is secured to a right-hand end in FIG. 5 of the trigger lever 61 and extends upwardly through and farther than an elongated hole 25*c* formed in the intermediate table 25 as seen in FIG. 4. The trigger lever 61 has a laterally bent extension 61*a* formed at a lower portion thereof in FIG. 5. The bent extension 61*a* of the trigger lever 61 extends upwardly (toward the rear in FIG. 5) farther than the intermediate table 25. The profile of the bent extension 61*a* of the trigger lever 61 can be seen particularly from FIGS. 6 and 7. Referring to FIGS. 6 and 7, the left-hand side end edge of the bent extension 61*a* of the trigger lever 61 serves as a curved guide edge 61*b*, and a hook 61*c* is formed at a left end of the bent extension 61*a* in an opposing relationship to a lower portion of the guide edge 61*b*.

Referring to FIGS. 4, 5 and 7, a stopper 61*e* is formed on a front edge of the trigger lever 61 by laterally bending a tab of the trigger lever 61 downwardly. The stopper 61*e* is fitted into an opening 26*a* formed in the clamp chassis 26 when a disk is clamped as hereinafter described. When the stopper 61*d* is fitted in the opening 26*a*, the trigger lever 61 is prevented from being moved in the leftward direction in FIG. 7 by the urging force of the spring 62.

Referring to FIGS. 4 and 5, a drawing out lever 65 is mounted for sliding movement on the disk drawing out portion 21 which extends leftwardly in FIG. 4 from the lift table 20 of the disk driving section F. The drawing out lever 65 is normally urged in the leftward direction in FIGS. 4 and 5 by a spring 66. A pressing member 67 is mounted at a left end in FIGS. 4 and 5 of the drawing out lever 65. In the arrangement shown in FIG. 1, the disk driving section F is driven to move upwardly or downwardly by the lifting mechanisms 10*a* to 10*c* to search a plurality of disks in a disk cartridge C loaded in position in the cartridge mounting section D or to a position at which a disk in the single disk supplying section E can be drawn out together with the disk tray 6. After the disk driving section F is moved to a selected vertical position, the drawing out lever 65 is moved in the rightward direction in FIGS. 4 and 5 so that the selected disk (disk tray 6 and disk on the disk tray 6) is pushed out toward the disk driving section F by the pressing member 67.

Subsequently, structure of a motor driving section shown in FIGS. 6 and 7 will be described.

Referring to FIGS. 5 to 7, a motor M is mounted on a side wall of the lift table 20. A driving pulley 81 is mounted on a rotary shaft of the motor M, and a belt 82 extends between the driving pulley 81 and a driven pulley 83. The driven pulley 83 is supported for rotation on the shaft 55 which serves also as a support shaft for the pivotal bracket 54 on which the upper roller 53 shown in FIG. 4 is supported. A small gear 83*a* is formed in an integral relationship on the driven pulley 83. A pair of speed reducing gears 84*a* and 84*b* are located on a side face of the pivotal bracket 54 opposite to the side face shown in FIG. 4. The speed reducing gear 84*a* is held in meshing engagement with the small gear 83*a* while the other speed reducing gear 84*b* is held in meshing engagement with a roller driving gear 86. The roller driving gear 86 is secured to an end portion of a shaft for the upper roller 53. Thus, power of the motor M is transmitted to the driven pulley 83 by way of the belt 82 and then to the roller driving gear 86 by way of the speed reducing gears 84*a* and 84*b* to drive the upper roller 53 to rotate.

The small gear 83*a* integral with the driven pulley 83 is held in meshing engagement with a large diameter gear 87. A small gear 87*a* is formed in an integral relationship on an end face of the large diameter gear 87 while another small gear 87*b* is formed in an integral relationship on the other end face of the large diameter gear 87. The small gear 87*a* is located sidewardly of a changeover rotary member 89 which will be hereinafter described. Meanwhile, the other small gear 87*b* is located in an opposing relationship for meshing engagement with a drawing out gear 88. Thus, power of the motor M is transmitted not only to the upper roller 53 for the feeding of a disk as described above but also to the changeover rotary member 89 and the drawing out gear 88 by way of the large diameter gear 87 and the small gears 87*a* and 87*b*. The changeover rotary member 89 is provided to drive the clamp chassis 26 and the disk reproducing unit 30 to move in their disk clamping direction while the drawing out gear 88 is provided to drive the drawing out lever 65 to push out a disk toward the disk reproducing unit 30 by means of the pressing member 67 shown at a left-hand side end portion of FIG. 5.

Referring to FIGS. 6 and 7, the small gear 87*a* integral with the large diameter gear 87 is held in meshing engagement with an intermediate gear 85*a*. The intermediate gear 85*a* has a driving gear 85 of a smaller diameter formed in an integral relationship thereon. Meanwhile, the changeover rotary member 89 has teeth 89*a* formed over a predetermined angular range on an outer periphery thereof for engaging with the driving gear 85. The changeover rotary member 89 further has a recessed portion 89*b* formed thereon, and in a position of the changeover rotary member 89 shown in FIG. 6, the recessed portion 89*b* thereof is opposed to the driving gear 85. A driving pin 89*c* is located on an end face of the changeover rotary member 89 such that it may be engaged with the guide edge 61*b* formed on the bent extension 61*a* of the trigger lever 61. The driving pin 89*c* is fitted in a driving hole 42*d* formed in a driving piece 42*c* in the form of a bent tab at an end portion of the lifting actuating lever 42 which is located on the intermediate table 25 for lifting the disk reproducing unit 30 as shown in FIG. 4.

Subsequently, a structure of a disk cartridge to be mounted onto the cartridge mounting section D will be described with reference to FIGS. 8 and 9.

The disk cartridge C shown includes a plastic case 90 and a plurality of, 6 in the arrangement shown, disks DS accommodated in the plastic case 90. In FIG. 9, the disk cartridge C is viewed from a leading end side thereof when it is to be inserted into the cartridge mounting section D.

A plurality of partition plates 92 are inserted in the case 90. A pair of spacers 92*a* are formed in an integral relationship on the opposite end edges of each of the partition plates 92 as seen in FIG. 9. The partition plates 92 are placed one on another and define therebetween slits S of a predetermined height in accordance with a vertical dimension of the spacers 92*a*. The inside of the case 90 is thus partitioned into a plurality of stages in the formed of slits S in each of which a disk DS is accommodated. In the disk cartridge C shown, the inside of the case 90 is partitioned into 6 slits S so that 6 disks DS may be accommodated therein.

Figure 8:
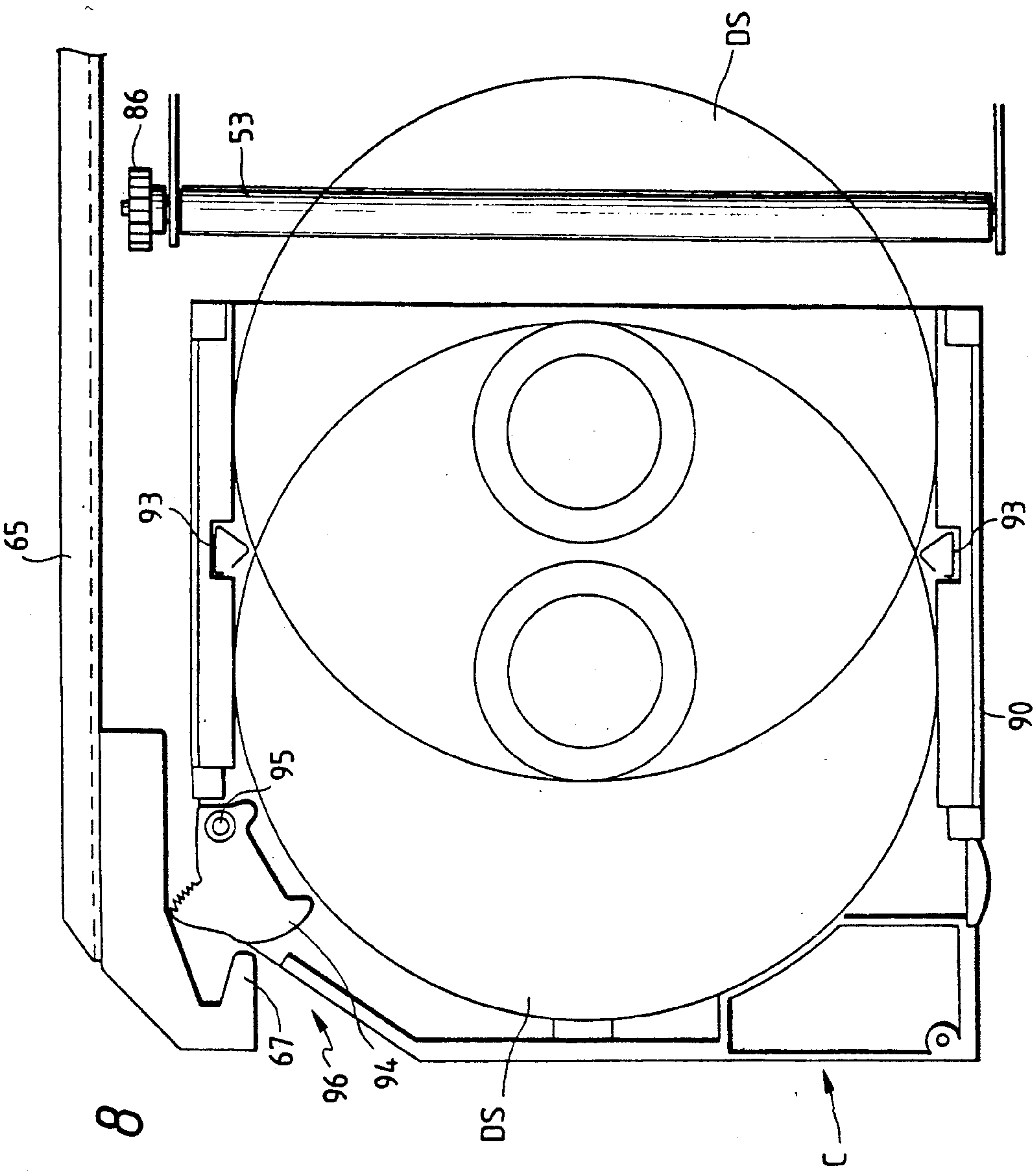
FIG. 8 is a sectional view illustrating an operation of discharging a disk from a disk cartridge.

A pair of left and right leaf springs 93 are accommodated in the case 90 as shown in FIG. 8. Each of the leaf springs 93 has a substantially triangular shape in plan and is disposed such that it extends perpendicularly through the partition plates 92. The leaf springs 93 urge a disk DS in a different direction in accordance with a position of the disk DS in the case 90 with respect to the leaf springs 93. In particular, when the disk DS is in its fully inserted position in the case 90, the leaf springs 93 urge the disk DS in its insertion direction, that is, in the leftward direction in FIG. 8, but after the disk DS is moved in its opposite discharging direction, that is, in the rightward direction in FIG. 8, farther than the leaf springs 93, it is urged in the discharging direction by the leaf springs 93. A plurality of, 6 in the arrangement shown, ejectors 94 are provided in a column at an interior location of the case 90. The ejectors 94 are supported for individual pivotal motion on a pin 95 and disposed on the interior side of the stages of the case 90 and in an opposing relationship to rear ends of disks DS accommodated in the slits S.

The case 90 has an inclined face 96 at a corner thereof at which the ejectors 94 are located. The inclined face 96 of the case 90 is inclined with respect to the insertion direction of the case 90. When the disk cartridge C is mounted in position on the cartridge mounting section D, the pressing member 67 provided at the rear end of drawing out lever 65 located on the lift table 20 is opposed to the inclined face 96 of the case 90 and particularly to a rear end of one of the ejectors 94.

Subsequently, operation of the disk player will be described.

The disk player in the present embodiment is constructed such that it may receive both of a disk cartridge C and a single disk therein. A disk DS is accommodated in each of the slits S of the disk cartridge C, and the cartridge C in which a plurality of such disks DS are accommodated is mounted on the cartridge mounting section D in the body chassis 1. On the other hand, when a single disk is to be reproduced, the slide table 5 will be projected outwardly from the body chassis 1 as shown in FIG. 1, and a disk of a desired type (which may have a different diameter) will be placed onto the disk tray 6. After the disk is placed in position, the slide table 5 is drawn into the body chassis 1 so that the disk tray 6 can thereafter be drawn out toward the disk reproducing unit 30 together with the disk placed thereon.

Subsequently, a reproducing operation will be described.

When a desired one of the disks in the disk cartridge C is to be reproduced, searching of the disk to be reproduced is performed first. The searching operation is performed by detecting and controlling an amount of rotation of the large gear 15 located on the lower face of the bottom plate 1*b* of the body chassis 1. Upon rotation of the large gear 15 which drives the intermediate gears 14 to rotate, the lifting screws 12 of the lifting mechanisms 10*a* to 10*c* are rotated in a synchronized relationship. By such rotation of the lifting screws 12, the disk driving section F shown in FIGS. 4 and 5 is moved upwardly or downwardly in the body chassis 1 together with the lift table 20. As described hereinabove, an amount of rotation of the large gear 15 located on the rear face of the bottom plate 1*b* is detected by a sensor, and it is possible to detect by such detecting operation of the sensor at what vertical position the lift table 20 is. By such recognition of a vertical position of the lift table 20, the lift table 20 can be positioned in an opposing relationship to a desired one of the slits of the cartridge C. On the other hand, when the single disk placed on the disk tray 6 is to be reproduced, the lift table 20 is moved down to its lowermost or lower limit position at which the disk driving section F opposes sidewardly to the disk tray 6.

In a condition after such searching operation is completed, the lift table 20 is stopped at a predetermined position at which the lower roller 52 and the upper roller 53 located thereon are opposed either forwardly of one of the slits S of the disk cartridge C or sidewardly of the disk tray 6. Further, as seen in FIG. 8, the pressing member 67 of the drawing out lever 65 located on the lift table 20 is opposed to one of the ejectors 94 of the disk cartridge C which corresponds to the slit S to which the rollers 52 and 53 oppose. On the other hand, when the single disk is to be reproduced, the pressing member 67 is opposed sidewardly to the disk tray 6.

After then, the motor M located on the lift table 20 is started. Before a disk DS is drawn in, the recessed portion 89*b* of the changeover rotary member 89 is opposed to the driving gear 85 as shown in FIG. 6, and consequently, while the driving gear 85 is rotated by the motor M, the power thereof is not transmitted to the changeover rotary member 89. Meanwhile, the driving pin 89*c* located on the changeover rotary member 89 is engaged with a lower portion of the guide edge 61*b* of the bent extension 61*a* of the trigger lever 61 and is opposed to the hook 61*c*. In this condition, the trigger lever 61 is at a position moved back in the leftward direction in FIG. 5 by the spring 62. Further, the driving pin 89*c* is fitted in the driving hole 42*d* of the driving piece 42*c* of the lifting actuating lever 42 and pushes down the lifting actuating lever 42 to a position pivoted in the clockwise direction.

In a loading operation of a disk, the driving pulley 81 provided on the motor M is driven to rotate in the clockwise direction in FIG. 6, and the driven pulley 83 is rotated similarly in the clockwise direction. The large diameter gear 87 is driven to rotate in the counterclockwise direction by the small gear 83*a* integral with the driven pulley 83. Then, the intermediate gear 85*a* and the driving gear 85 integral with the intermediate gear 85*a* are rotated in the clockwise direction. However, the power is not transmitted to the changeover rotary member 89 because the recessed portion 89*b* thereof is opposed to the driving gear 85. Meanwhile, rotation of the driven pulley 83 is transmitted from the small gear 83*a* to the roller driving gear 86 by way of the speed reducing gears 84*a* and 84*b* shown in FIG. 5 so that the upper roller 53 is rotated in the counterclockwise direction in FIG. 4. In the meantime, after the motor M is started, power is transmitted from the small gear 87*b* integral with the large diameter gear 87 to the drawing out gear 88 shown in FIG. 5, and the drawing out lever 65 is moved in the rightward direction in FIG. 5 by the drawing out gear 88. Thereupon, the pressing member 67 at the left-hand end of the disk drawing out lever 65 pushes an opposing one of the ejectors 94 of the disk cartridge 94 as seen from FIG. 8 so that a corresponding one of the disks DS is pushed out from within the disk cartridge C. On the other hand, when the single disk is to be reproduced, the disk tray 6 is pushed out by the pressing member 67 together with the disk received thereon. The disk (or the disk tray 6 and the disk on the disk tray 6) selectively pushed out in this manner is held between the upper roller 53 and the lower roller 52 of the disk driving section F and then drawn out in the rightward direction in FIG. 4 by the force of rotation of the upper roller 53 which is driven to rotate by the motor M as described above. The disk (or the disk tray 6 and the disk thereon) passes between the turntable 33 and the clamper 39 in the disk driving section F. When the disk or the disk tray 6 is fed into the disk driving section F until it comes to a position a little forwardly of a regular loading position, it is engaged with the large diameter portion 60*a* (or small diameter portion 60*b* depending upon an angular position of the disk) of the detecting element 60. Then, due to the feeding force provided by the rollers 52 and 53, the disk DS moves the detecting element 60 in the rightward direction in FIG. 6. Consequently, the trigger lever 61 is moved in the rightward direction in FIG. 6 by and together with the detecting element 60 whereupon the hook 61*c* provided at the lower portion in FIG. 6 of the bent extension 61*a* of the trigger lever 61 draws the driving pin 89*c* in the rightward direction in FIG. 6. Thereupon, the changeover rotary member 89 is rotated in the counterclockwise direction by the driving pin 89*c* to put the teeth 89*a* thereof into meshing engagement with the driving gear 85. Consequently, the power of the driving gear 85 being driven by the motor M is thereafter transmitted to the changeover rotary member 89 by way of the teeth 89*a* to rotate the changeover rotary member 89 in the counterclockwise direction. Then, the motor M is stopped at a point of time when the changeover rotary member 89 is rotated to such an angular position as shown in FIG. 7. While the changeover rotary member 89 is rotated in the counterclockwise direction from the position shown in FIG. 6 to the position shown in FIG. 7, the driving pin 89*c* is engaged with an upper edge of the driving hole 42*d* of the lifting actuating lever 42 and then pushes the lifting actuating lever 42 to pivot in the counterclockwise direction. Referring to FIG. 4, when the lifting actuating lever 42 is pivoted in the counterclockwise direction in this manner, the right-hand side pushing up arm 42*a* thereof pushes up the engaging piece 38 to pivot the clamp chassis 26 and the disk reproducing unit 30 upwardly around the fulcrum 27. Upon such pivotal motion, the turntable 33 is engaged with the center hole of the disk DS and pushes up the disk DS until the disk DS is clamped in position between the turntable 33 and the clamper 39. Meanwhile, when the lifting actuating lever 42 is pivoted in the counterclockwise direction, the pressing finger 42*b* thereof pushes the engaging tab 54*a* of the pivotal bracket 54 to pivot the pivotal bracket 54 in the clockwise direction. As a result, the upper roller 53 supported on the pivotal bracket 54 is moved upwardly away from the lower roller 52 over a great distance. Thus, during an operation until a disk is lifted and clamped by the turntable 33, the upper roller 53 escapes upwardly over a great distance in response to a lifting movement of a disk. The disk DS is thus clamped with certainty between the turntable 33 and the clamper 39 through such operation as described above.

When the changeover rotary member 89 is rotated in the counterclockwise direction, the driving pin 89*c* moves upwardly while sliding on the curve of the guide edge 61*b* of the trigger lever 61, and in the final condition shown in FIG. 7, the driving pin 89*c* is clear of the guide edge 61*b* of the trigger lever 61. In this instance, however, the clamp chassis 26 is already in its lifted position, and the downwardly bent stopper 61*e* of the trigger lever 61 is engaged in the opening 26*a* of the clamp chassis 26. Due to such engagement, the trigger lever 61 is prevented from being returned in the leftward direction in FIG. 7 by the force of the spring 62, and consequently, the detecting element 60 remains at its position shown in FIG. 7.

In summary, when a disk DS is fed into the disk driving section F, it is engaged with the detecting element 60 at a position a little forwardly of the regular loading position and moves the detecting element 60 and the trigger lever 61 in the rightward direction in FIGS. 4, 6 and 7, and after completion of clamping of the disk DS, the detecting element 60 is held at the rightwardly moved position.

Meanwhile, the detecting element 60 has the larger diameter portion 60*a* and the smaller diameter portion 60*b* at the base and the other end thereof, respectively. In such a disk feeding operation as described above, a leading end portion of the disk will be engaged with the larger diameter portion 60*a* of the detecting element 60 (or else with the smaller diameter portion 60*b* depending upon a feeding angular position of the disk DS) to move the detecting element 60. Then, the disk DS will be displaced upwardly from the route of insertion thereof by a clamping operation. Thereupon, the disk is spaced away from the larger diameter portion 60*a* of the detecting element 60 and comes to a position opposing sidewardly to the smaller diameter portion 60*b* of the detecting element 60 as seen in FIG. 7. Consequently, during a reproducing operation, the disk remains in a spaced relationship from the detecting element 60.

After completion of reproduction of the disk, the motor M is rotated in reverse in the condition shown in FIG. 7. Consequently, the driving pulley 81 and the driven pulley 83 are driven to rotate in the counterclockwise direction in FIG. 7. As a result, the changeover rotary member 89 is rotated in the clockwise direction to return to the position thereof shown in FIG. 6. During such rotation of the changeover rotary member 89, the lifting actuating lever 42 is driven to pivot in the clockwise direction by the driving pin 89*c*. Consequently, the clamp chassis 26 shown in FIG. 4 is pivoted back to its normal position by the urging force of the spring 28 to cancel the clamping condition of the disk. Further, upon pivotal motion of the lifting actuating lever 42 in the clockwise direction, the pivotal bracket 54 shown in FIG. 4 is pivoted back in the counterclockwise direction by the urging force of the spring 56 to move down the upper roller 53 until the disk is held between the upper roller 53 and the lower roller 52. The power of reverse rotation of the motor M is transmitted to the roller driving gear 86 by way of the speed reducing gears 84*a* and 84*b* so that the upper roller 53 is rotated in the clockwise direction in FIG. 4. Consequently, the disk is returned into the disk cartridge C or else the disk DS and the disk tray 6 on which the disk DS is carried are returned into the slide table 5 by the rollers 52 and 53.

It is to be noted that, while the disk reproducing unit 30 in the embodiment described above is lifted by the lifting actuating lever 42 when the changeover rotary member 89 is rotated, alternatively the clamper opposing to the turntable may be moved toward the turntable by a similar mechanism to clamp a disk between the turntable and the clamper.

Further, while the disk player in the embodiment described above is constructed such that it accepts both of a disk cartridge C and a single disk, the present invention can be applied to a disk player of the type which only accepts a disk cartridge and also to a disk player of another type which only accepts a single disk.

Having now fully described the invention, it will be apparent to one of ordinary skill in the art that many changes and modifications can be made thereto without departing from the spirit and scope of the invention as set forth herein.

What is claimed is:

1. A disk loading device for a disk player which includes a disk driving section including a turntable for driving a disk to rotate and a pickup for reading information on a disk being driven by said turntable, a disk feeding mechanism for feeding a disk into said disk driving section, and a clamping mechanism for fixing a central portion of a disk fed into said disk driving section to said turntable, comprising:

a detecting element disposed for engagement by a leading end portion of a disk being fed by said disk feeding mechanism to move in the same direction as the direction of movement of the disk, and wherein said detecting element moves from a position of being moved by the disk upon feeding of the disk to a second position at which the disk is positioned at its fixed clamped position;

a motor-driven driving rotary member for driving said disk feeding mechanism;

a changeover rotary member normally disconnected from said driving rotary member but rotatable to an operative position at which said changeover rotary member is connected to said driving rotary member so that said changeover rotary member is driven to rotate by said driving rotary member;

a trigger member disposed for integral movement with said detecting element to rotate said changeover rotary member to said operative position; and a power transmitting mechanism for transmitting power of rotation of said changeover rotary member by said driving rotary member to operate said clamping mechanism.

2. A disk loading device according to claim 1, wherein said disk feeding mechanism and said power transmitting mechanism are driven by a single motor.

3. A disk loading device according to claim 1, wherein said disk feeding mechanism is carried on a lift table which carries thereon and moves said disk driving section upwardly and downwardly, and said disk driving section is moved with respect to a disk drawn out at said disk feeding mechanism.

4. A disk loading device for a disk player which includes a disk driving section including a turntable for driving a disk to rotate and a pickup for reading information on a disk being driven by said turntable, a disk feeding mechanism for feeding a disk into said disk driving section, and a clamping mechanism for fixing a central portion of a disk fed into said disk driving section to said turntable, comprising:

a detecting element disposed for engagement by a leading end portion of a disk being fed by said disk feeding mechanism to move in the same direction as the direction of movement of the disk;

a motor-driven driving rotary member for driving said disk feeding mechanism;

a changeover rotary member normally disconnected from said driving rotary member but rotatable to an operative position at which said changeover rotary member is connected to said driving rotary member so that said changeover rotary member is driven to rotate by said driving rotary member;

a trigger member disposed for integral movement with said detecting element to rotate said changeover rotary member to said operative position; and a power transmitting mechanism for transmitting the power of rotation of said changeover rotary member by said driving rotary member to operate said clamping mechanism;

wherein said changeover rotary member has a driving pin located thereon for engaging with said trigger member and has formed on an outer periphery thereof a recessed portion at which said changeover rotary member is not rotated by said driving rotary member, and said changeover rotary member is positioned, before said detecting element is pushed, such that said recessed portion thereof is opposed to said driving rotary member, but when said detecting element is pushed by a disk and moved together with said trigger member, said changeover rotary member is rotated to said operative position at which force of rotation of said driving rotary member is transmitted to said changeover rotary member.

5. The device of claim 1, wherein said disk feeding mechanism and said clamping mechanism are driven by a single motor by means of said power transmitting mechanism.

6. The device of claim 1, wherein said disk is fed by said disk feeding mechanism into a predetermined position in said disk driving mechanism only by positive mechanical action of said disk feeding mechanism as detected by said detecting element thereby not requiring any feedback from a sensor.

* * * * *